(12) United States Patent
Gordon et al.

(10) Patent No.: US 9,905,022 B1
(45) Date of Patent: Feb. 27, 2018

(54) ELECTRONIC DISPLAY FOR DEMONSTRATING EYEWEAR FUNCTIONALITY

(71) Applicant: Oakley, Inc., Foothill Ranch, CA (US)

(72) Inventors: Philip Denton Gordon, Castiglione torinese (IT); Brock Scott McCabe, Laguna Niguel, CA (US); Ryan Saylor, Mission Viejo, CA (US)

(73) Assignee: Oakley, Inc., Foothill Ranch, CA (US)

( * ) Notice: Subject to any disclaimer, the term of this patent is extended or adjusted under 35 U.S.C. 154(b) by 96 days.

(21) Appl. No.: 14/973,493

(22) Filed: Dec. 17, 2015

Related U.S. Application Data

(60) Provisional application No. 62/104,602, filed on Jan. 16, 2015.

(51) Int. Cl.
*G02C 3/00* (2006.01)
*G06T 7/40* (2017.01)
*G06K 9/46* (2006.01)
*G09G 5/02* (2006.01)
*G09G 5/10* (2006.01)
*G09B 5/02* (2006.01)

(52) U.S. Cl.
CPC ............ *G06T 7/408* (2013.01); *G06K 9/4652* (2013.01); *G06K 9/4661* (2013.01); *G09B 5/02* (2013.01); *G09G 5/02* (2013.01); *G09G 5/10* (2013.01)

(58) Field of Classification Search
CPC ... G02C 7/10; G02C 7/02; G02C 7/12; G02C 7/104; G02B 5/23
USPC ............. 351/159.49, 159.59–159.65, 159.73
See application file for complete search history.

(56) References Cited

U.S. PATENT DOCUMENTS

| 2,219,122 A | 10/1940 | Weidert et al. |
| 3,701,590 A | 10/1972 | Zeltzer |
| 3,877,797 A | 4/1975 | Thornton, Jr. |
| 4,176,299 A | 11/1979 | Thornton, Jr. |

(Continued)

FOREIGN PATENT DOCUMENTS

| CN | 1338622 | 3/2002 |
| CN | 2859575 | 1/2007 |

(Continued)

OTHER PUBLICATIONS

"ANSI Z80.3-2010 American National Standard for Opthalmics-Nonprescription Sunglass and Fashion Eyewear Requirements," Jun. 7, 2010, pp. 1-25.

(Continued)

*Primary Examiner* — James Greece
(74) *Attorney, Agent, or Firm* — Sterne, Kessler, Goldstein & Fox P.L.L.C.

(57) ABSTRACT

Embodiments disclosed herein include systems and methods for demonstrating the functionality of eyewear using digital images on an electronic display. The functionality of certain types of eyewear, such as, for example, sunglasses, may not be readily perceivable when the wearer is indoors. In some embodiments, a demonstration image is shown on an electronic display. In certain embodiments, the demonstration image can have a background portion, a wanted color portion, and unwanted color portion, and/or other portions that cooperate with an optical filter of the eyewear to simulate and/or emphasize the functionality of the eyewear when viewing real-world scenes.

32 Claims, 10 Drawing Sheets

(56) References Cited

U.S. PATENT DOCUMENTS

| | | | |
|---|---|---|---|
| 4,288,250 | A | 9/1981 | Yamashita |
| 4,300,819 | A | 11/1981 | Taylor |
| 4,354,739 | A | 10/1982 | Scanlon et al. |
| 4,376,829 | A | 3/1983 | Daiku |
| 4,405,881 | A | 9/1983 | Kobayashi |
| 4,521,524 | A | 6/1985 | Yamashita |
| 4,659,178 | A | 4/1987 | Kyogoku |
| 4,663,562 | A | 5/1987 | Miller et al. |
| 4,687,926 | A | 8/1987 | Plummer |
| 4,769,347 | A | 9/1988 | Cook et al. |
| 4,802,755 | A | 2/1989 | Hensler |
| 4,826,286 | A | 5/1989 | Thornton, Jr. |
| 4,838,673 | A | 6/1989 | Richards et al. |
| 4,998,817 | A | 3/1991 | Zeltzer |
| 5,039,631 | A | 8/1991 | Krashkevich et al. |
| RE33,729 | E | 10/1991 | Perilloux |
| 5,054,902 | A | 10/1991 | King |
| 5,061,659 | A | 10/1991 | Ciolek et al. |
| 5,077,240 | A | 12/1991 | Hayden et al. |
| 5,121,030 | A | 6/1992 | Schott |
| 5,121,239 | A | 6/1992 | Post |
| 5,149,183 | A | 9/1992 | Perrott et al. |
| 5,164,858 | A | 11/1992 | Aguilera, Jr. et al. |
| 5,190,896 | A | 3/1993 | Pucilowski et al. |
| 5,218,386 | A | 6/1993 | Levien |
| 5,408,278 | A | 4/1995 | Christman |
| 5,438,024 | A | 8/1995 | Bolton et al. |
| 5,446,007 | A | 8/1995 | Krashkevich et al. |
| 5,574,517 | A | 11/1996 | Pang et al. |
| 5,592,245 | A | 1/1997 | Moore et al. |
| 5,646,479 | A * | 7/1997 | Troxell ............... H01J 31/127 313/309 |
| 5,646,781 | A | 7/1997 | Johnson, Jr. |
| 5,694,240 | A | 12/1997 | Sternbergh |
| 5,715,031 | A | 2/1998 | Roffman et al. |
| 5,729,323 | A | 3/1998 | Arden et al. |
| 5,731,898 | A | 3/1998 | Orzi et al. |
| 5,774,202 | A | 6/1998 | Abraham et al. |
| 5,922,246 | A | 7/1999 | Matsushita et al. |
| 5,925,468 | A | 7/1999 | Stewart |
| 6,045,224 | A * | 4/2000 | Kallenbach ............ G02C 5/001 351/158 |
| 6,132,044 | A | 10/2000 | Sternbergh |
| 6,135,595 | A | 10/2000 | Takeshita et al. |
| 6,138,286 | A | 10/2000 | Robrahn et al. |
| 6,142,626 | A | 11/2000 | Lu et al. |
| 6,145,984 | A | 11/2000 | Farwig |
| 6,175,450 | B1 | 1/2001 | Andreani et al. |
| 6,313,577 | B1 | 11/2001 | Kunisada et al. |
| 6,334,680 | B1 | 1/2002 | Larson |
| 6,382,788 | B1 | 5/2002 | Stehager |
| 6,391,810 | B1 | 5/2002 | Lenhart |
| 6,450,652 | B1 | 6/2002 | Karpen |
| 6,416,867 | B1 | 7/2002 | Karpen |
| 6,420,290 | B1 | 7/2002 | Brocheton et al. |
| 6,460,994 | B1 | 10/2002 | Nolan |
| 6,604,824 | B2 | 8/2003 | Larson |
| 6,631,987 | B2 | 10/2003 | Reichow et al. |
| 6,641,261 | B2 | 11/2003 | Wang et al. |
| RE38,402 | E | 1/2004 | Stephens et al. |
| 6,677,260 | B2 | 1/2004 | Crane et al. |
| 6,770,692 | B1 | 8/2004 | Kobayashi et al. |
| 6,773,816 | B2 | 8/2004 | Tsutsumi |
| 6,811,258 | B1 | 11/2004 | Grant |
| 6,811,727 | B2 | 11/2004 | Havens et al. |
| 6,852,657 | B2 | 2/2005 | Kolberg et al. |
| 6,863,397 | B2 | 3/2005 | Nakano |
| 6,893,127 | B2 | 5/2005 | Reichow et al. |
| 6,926,405 | B2 | 8/2005 | Ambler et al. |
| 6,932,472 | B2 | 8/2005 | Marason et al. |
| 6,955,430 | B2 | 10/2005 | Pratt |
| 6,979,083 | B2 | 12/2005 | Kerns, Jr. et al. |
| 6,984,038 | B2 | 1/2006 | Ishak |
| 7,029,118 | B2 | 4/2006 | Ishak |
| 7,035,010 | B2 | 4/2006 | Iori et al. |
| 7,106,509 | B2 | 9/2006 | Sharp |
| 7,255,435 | B2 | 8/2007 | Pratt |
| 7,256,921 | B2 | 8/2007 | Kumar et al. |
| 7,276,544 | B2 | 10/2007 | Lai et al. |
| 7,278,737 | B2 | 10/2007 | Mainster et al. |
| 7,349,138 | B2 | 3/2008 | Kumar et al. |
| 7,372,640 | B2 | 5/2008 | Fung |
| 7,393,100 | B2 | 7/2008 | Mertz |
| 7,506,976 | B2 | 3/2009 | Baiocchi et al. |
| 7,506,977 | B1 | 3/2009 | Aiiso |
| 7,520,608 | B2 | 4/2009 | Ishak et al. |
| 7,556,376 | B2 | 7/2009 | Ishak et al. |
| 7,597,441 | B1 | 10/2009 | Farwig |
| 7,656,581 | B2 | 2/2010 | Giraudet |
| 7,717,557 | B2 | 5/2010 | Kobayashi et al. |
| 7,732,006 | B2 | 6/2010 | Alberto de Rojas |
| 7,901,074 | B2 | 3/2011 | Yamamoto et al. |
| 7,922,324 | B2 | 4/2011 | Ishibashi et al. |
| 8,210,678 | B1 | 7/2012 | Farwig |
| 8,733,929 | B2 | 5/2014 | Chiou et al. |
| 8,770,749 | B2 | 7/2014 | McCabe et al. |
| 9,134,547 | B2 | 9/2015 | McCabe et al. |
| 9,146,336 | B2 | 9/2015 | Matsumoto et al. |
| 9,383,594 | B2 | 7/2016 | McCabe et al. |
| 2001/0005281 | A1 | 6/2001 | Yu |
| 2003/0020988 | A1 | 1/2003 | Stone |
| 2003/0076474 | A1 * | 4/2003 | Wang .................... G02C 7/105 351/159.63 |
| 2004/0005482 | A1 | 1/2004 | Kobayashi et al. |
| 2004/0246437 | A1 | 12/2004 | Ambler et al. |
| 2005/0009964 | A1 | 1/2005 | Sugimura et al. |
| 2005/0168690 | A1 | 8/2005 | Kawai et al. |
| 2005/0175969 | A1 | 8/2005 | Hayes |
| 2005/0224703 | A1 | 10/2005 | Harada et al. |
| 2006/0033851 | A1 | 2/2006 | Iori et al. |
| 2006/0146275 | A1 | 7/2006 | Mertz |
| 2006/0158881 | A1 | 7/2006 | Dowling |
| 2007/0097509 | A1 | 5/2007 | Nevitt et al. |
| 2007/0122626 | A1 | 5/2007 | Qin et al. |
| 2007/0126983 | A1 | 6/2007 | Godeau et al. |
| 2008/0068555 | A1 | 3/2008 | Lau et al. |
| 2008/0221674 | A1 | 9/2008 | Blum et al. |
| 2008/0278676 | A1 | 11/2008 | Croft et al. |
| 2008/0291140 | A1 | 11/2008 | Kent et al. |
| 2009/0040564 | A1 | 2/2009 | Granger |
| 2009/0268102 | A1 | 10/2009 | Barazza |
| 2010/0054632 | A1 | 3/2010 | McCormick et al. |
| 2010/0066974 | A1 | 3/2010 | Croft et al. |
| 2010/0073765 | A1 | 3/2010 | Brocheton |
| 2010/0232003 | A1 | 9/2010 | Baldy et al. |
| 2010/0283956 | A1 | 11/2010 | Jackson et al. |
| 2011/0043902 | A1 | 2/2011 | Ishibashi et al. |
| 2012/0236249 | A1 | 9/2012 | Miwa et al. |
| 2014/0233105 | A1 | 8/2014 | Schmeder |
| 2015/0022777 | A1 | 1/2015 | McCabe et al. |
| 2016/0041408 | A1 | 2/2016 | Carlson et al. |
| 2016/0048037 | A1 | 2/2016 | McCabe et al. |
| 2016/0070119 | A1 | 3/2016 | McCabe et al. |

FOREIGN PATENT DOCUMENTS

| | | |
|---|---|---|
| DE | 3534575 | 4/1986 |
| EP | 0 127 821 | 12/1984 |
| EP | 0 519 660 | 12/1992 |
| EP | 1 986 024 | 10/2008 |
| FR | 2812629 | 2/2002 |
| GB | 1154500 | 6/1969 |
| JP | S63-008703 | 1/1988 |
| JP | H05-202109 | 8/1993 |
| JP | 2001-506012 | 5/2001 |
| JP | 2007-025609 | 2/2007 |
| JP | 2010-204383 | 9/2010 |
| WO | WO 88/002871 | 4/1988 |
| WO | WO 97/035215 | 9/1997 |
| WO | WO 99/067681 | 12/1999 |
| WO | WO 02/014930 | 2/2002 |
| WO | WO 2008/014225 | 1/2008 |
| WO | WO 2009/011439 | 1/2009 |
| WO | WO 2009/152381 | 12/2009 |

(56) References Cited

FOREIGN PATENT DOCUMENTS

| WO | WO 2011/127015 | 10/2011 |
|---|---|---|
| WO | WO 2011/130314 | 10/2011 |
| WO | WO 2012/119158 | 9/2012 |
| WO | WO 2013/070417 | 5/2013 |
| WO | WO 2013/074269 | 5/2013 |
| WO | WO 2014/055513 | 4/2014 |
| WO | WO 2015/179538 | 11/2015 |
| WO | WO 2016/077431 | 5/2016 |

OTHER PUBLICATIONS

British Standard, "Personal Eye-Equipment—Sunglasses and Sunglare Filters for General Use and Filters for Direct Observation of the Sun," Technical Committee CEN/TC 85, Sep. 2007, pp. 46.
Drum, Bruce, "FDA Regulation of Labeling and Promotional Claims in Therapeutic Color Vision Devices: A Tutorial," Visual Neuroscience, May 2004, vol. 21, No. 3, pp. 461-463.
Encyclopedia of Polymer Science and Technology—Plastics, Resins, Rubbers, Fibers, edited by Mark, H. et al, vol. 9, John Wiley & Sons, 1968, USAA, pp. 6.
Golz et al., "Colorimetry for CRT displays," Journal of the Optical Society of America A, vol. 20, No. 5, May 2003, pp. 769-781.
Kirkpatrick et al., "Optimization by Simulated Annealing," Science, New Series, May 13, 1983, vol. 220, No. 4598, pp. 671-680.
Linear Programming, Feb. 28, 2011, http://en.wikipedia.org/w/index.php?title=Linear_programmming&oldid=416428507, pp. 14.
Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.
Nakamura et al, "Diffusion Coefficients of Disperse Dye to PE and PET Films in Supercritical Carbon Dioxide", School of Natural System, College of Science and Engineering, Kanazawa University, Japan, Proceedings of 9th International Symposium on Super Critical Fluids, May 18-20, 2009, Arachon, France, pp. 6.
"Product Description: Lagoon Sunglasses", Maui Jim website, address: http://www.mauijim.com/lagoon.html, page was publicly printed on Feb. 18, 2014, web available at least as early as Nov. 2009.
Rea et al., "Color Rendering: Beyond Pride and Prejudice," Color Research & Application, Dec. 2010, vol. 35, No. 6, pp. 401-409.
Sharp et al., "Retarder Stack Technology for Color Manipulation," SID Symposium Digest of Technical Papers, May 1999, vol. 30, No. 1, pp. 1072-1075.
Stockman et al., "The Spectral Sensitivities of the Middle- and Long-Wavelength-Sensitive Cones Derived from Measurements in Observers of known Genotype," Vision Research, vol. 40, Jun. 2000, pp. 1711-1737.
Swillam et al., "The Design of Multilayer Optical Coatings Using Convex Optimization," Journal of Lightwave Technology, Apr. 2007, vol. 25, No. 4, pp. 1078-1085.
Tilsch et al., "Manufacturing of Precision Optical Coatings," Chinese Optics Letters, Apr. 30, 2010, vol. 8, Supplement, pp. 38-43.
Vorobyev et al., "Receptor Noise as a Determinant of Colour Thresholds," Proceedings of the Royal Society of London B, Mar. 1998, vol. 265, pp. 351-358.

* cited by examiner

| Name | Visual angle, ° | Pixel size, m | Size (DS), in. | Preferred Minimum Viewing Distance, in. |
|---|---|---|---|---|
| Electronic Display 1 | 0.0059 | 7.8E-05 | 4 | 6.2 |
| Electronic Display 2 | 0.0059 | 7-8E-05 | 7.9 | 15.1 |
| Electronic Display 3 | 0.0072 | 9.6E-05 | 9.7 | 18.5 |
| Electronic Display 4 | 0.0072 | 9.6E-05 | 9.7 | 18.5 |
| Electronic Display 5 | 0.0088 | 1.2E-04 | 7 | 11.8 |
| Electronic Display 6 | 0.0059 | 7.9E-05 | 7 | 11.8 |
| Electronic Display 7 | 0.0075 | 1.0E-04 | 8.9 | 15.0 |
| Electronic Display 8 | 0.0056 | 7.5E-05 | 8.9 | 15.0 |
| Electronic Display 9 | 0.0113 | 1.5E-04 | 7 | 11.3 |
| Electronic Display 10 | 0.0101 | 1.3E-04 | 8 | 13.5 |
| Electronic Display 11 | 0.0064 | 8.5E-05 | 10.1 | 17.0 |

FIG. 5

ELECTRONIC DISPLAY FOR DEMONSTRATING EYEWEAR FUNCTIONALITY

INCORPORATION BY REFERENCE OF RELATED APPLICATIONS

This application claims the benefit of priority under 35 USC § 119 of U.S. Provisional Patent Application No. 62/104,602, filed Jan. 16, 2015, titled SYSTEMS AND METHODS FOR DEMONSTRATING EYEWEAR FUNCTIONALITY. The entire contents of the above referenced application is incorporated by reference herein and made part of this specification.

BACKGROUND

Field

This disclosure relates generally to systems and methods for demonstrating functionality of eyewear using digital images on an electronic display.

Description of Related Art

Eyewear, such as spectacles, sunglasses, and goggles, can include one or more lenses with an optical filter that attenuates light in one or more spectral bands. For example, sunglasses and some other types of outdoor eyewear can include an optical filter that absorbs a significant portion of light in the visible spectrum. Certain types of eyewear suited for use in bright light can have a lens with an optical filter that attenuates visible light strongly, thereby significantly decreasing the luminous transmittance of the lens. Other types of eyewear can be suited for use indoors or in other environments with lower levels of illumination.

SUMMARY

Example embodiments described herein have several features, no single one of which is indispensable or solely responsible for their desirable attributes. Without limiting the scope of the claims, some of the advantageous features will now be summarized.

Embodiments disclosed herein include systems and methods suitable for demonstrating functionality of eyewear in an indoor environment. The functionality of certain types of eyewear, such as, for example, sunglasses, may not be readily perceivable when the wearer is indoors. In some embodiments, a demonstration image is shown on an electronic display. Electronic displays can display images with a variety of colors; however, an image viewed on an electronic display cannot closely replicate the appearance of a natural scene in some respects due to certain factors.

Some embodiments provide an electronic display configured to demonstrate one or more features of an optical filter for eyewear that has an absorbance peak and/or an attenuation peak within at least one spectral band. The display can include a display controller configured to display on the electronic display an image associated with image data stored on a physical memory device in operative communication with the display controller. The image data can include a portion with a feature of interest. The optical filter can improve the ability of a human with substantially normal vision to perceive the feature of interest when the image is displayed on the electronic display, compared to an unfiltered view of the displayed image. In some embodiments, the image data comprises a background portion that includes details that are recognizable as real-world scenery.

In certain embodiments, the electronic display has a pixel density greater than or equal to 100 pixels per inch; a capability of displaying imagery with a luminance greater than or equal to 300 candelas per square meter; a color gamut greater than or equal to 70% of the sRGB color space; and/or a diagonal dimension of greater than or equal to 5 inches.

In some embodiments, the image data includes an unwanted color portion configured to at least partially obscure the feature of interest. The spectral power distribution of the unwanted color portion can include a luminous emittance peak having a bandwidth equal to a full width of the luminous emittance peak at 80% of a maximum luminance of the luminous emittance peak. An absorbance peak of the optical filter can have a bandwidth equal to a full width of the absorbance peak at 80% of the maximum absorbance of the absorbance peak. In certain embodiments, the bandwidth of the luminous emittance peak overlaps the bandwidth of the absorbance peak by greater than or equal to 5 nm.

Certain embodiments provide a system for demonstrating one or more features of eyewear comprising an optical filter that has an absorbance peak and/or an attenuation peak in one or more spectral bands. The system can include the electronic display, a viewing location for a user to view the electronic display, and eyewear comprising the optical filter.

In some embodiments, the user is positioned at a specified viewing distance greater than or equal to 6 inches from the electronic display. The specified viewing distance can depend on a plurality of factors, including, for example, a diagonal dimension of the electronic display and/or a hardware pixel size of the electronic display.

Certain embodiments provide a method for preparing a digital image for demonstrating one or more features of an optical filter for eyewear that has an absorbance peak and/or an attenuation peak within at least one spectral band. The method can include storing image data on a physical memory device in operative communication with an electronic display. The image data can include a portion with a feature of interest. The optical filter can improve the ability of a human with substantially normal vision to perceive the feature of interest when the image is displayed on the electronic display, compared to an unfiltered view of the displayed image.

Some embodiments provide a method for demonstrating one or more features of eyewear comprising an optical filter that has an absorbance peak and/or an attenuation peak within at least one spectral band. The method can include storing the image data on a physical memory device in operative communication with an electronic display, displaying the image data on the electronic display, and providing eyewear having the optical filter to a viewer of the electronic display.

BRIEF DESCRIPTION OF THE DRAWINGS

Various embodiments are depicted in the accompanying drawings for illustrative purposes, and should in no way be interpreted as limiting the scope of the claims. In addition, various features of different disclosed embodiments can be combined to form additional embodiments, which are part of this disclosure. Any feature or structure can be removed or omitted. Throughout the drawings, reference numbers can be reused to indicate correspondence between reference elements.

FIG. 5 is a table showing the visual acuity threshold for various electronic displays.

DETAILED DESCRIPTION OF CERTAIN EMBODIMENTS

Figure 1A:
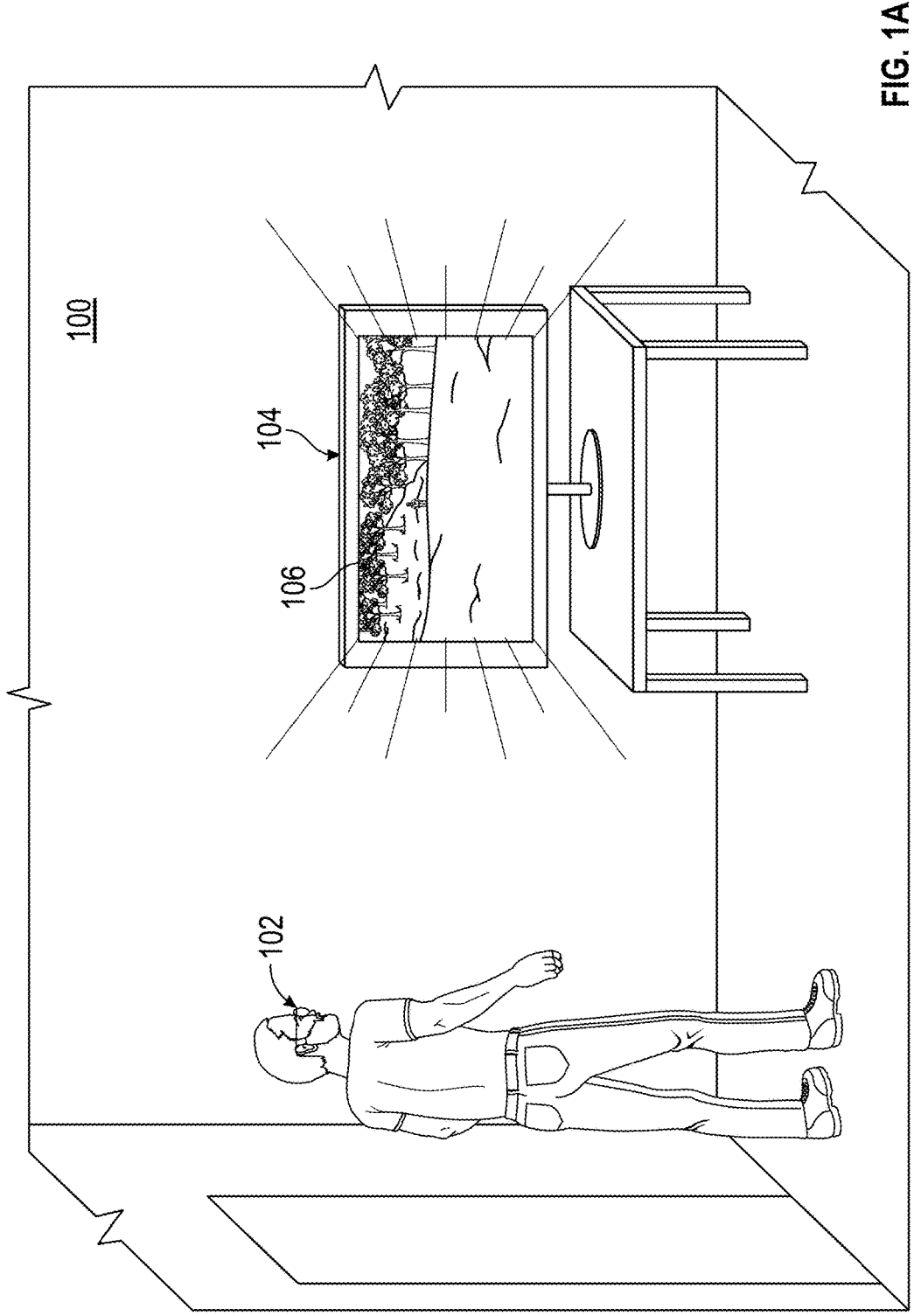
FIG. 1A illustrates an eyewear demonstration system incorporating an electronic display displaying an image adapted for viewing through an optical filter of the eyewear.

Although certain preferred embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Objects that humans can visually observe in the environment typically emit, reflect, or transmit visible light from one or more surfaces. The surfaces can be considered an array of points that the human eye is unable to resolve any more finely. Each point on the surfaces does not emit, reflect, or transmit a single wavelength of light; rather, it emits, reflects, or transmits a broad spectrum of wavelengths that are interpreted as a single color in human vision. Generally speaking, if one were to observe the corresponding "single wavelength" of light for that interpreted color (for example, a visual stimulus having a very narrow spectral bandwidth, such as 1 nm), it would appear extremely vivid when compared to a color interpreted from a broad spectrum of observed wavelengths.

An optical filter can be configured to remove the outer portions of a broad visual stimulus to make colors appear more vivid as perceived in human vision. The outer portions of a broad visual stimulus refer to wavelengths that, when substantially, nearly completely, or completely attenuated, decrease the bandwidth of the stimulus such that the vividness of the perceived color is increased. An optical filter for eyewear can be configured to substantially increase the colorfulness, clarity, and/or vividness of a scene. Such an optical filter for eyewear can allow the wearer to view the scene in high definition color (HD color). In some embodiments, portions of a visual stimulus that are not substantially attenuated include at least the wavelengths for which cone photoreceptor cells in the human eye have the greatest sensitivity. In certain embodiments, the bandwidth of the color stimulus when the optical filter is applied includes at least the wavelengths for which the cone photoreceptor cells have the greatest sensitivity. In some embodiments, a person wearing eyewear with lenses incorporating an optical filter disclosed herein can perceive a substantial increase in the clarity of a scene compared to eyewear with a neutral attenuation filter. The increase in perceived clarity can result, for example, from increased contrast, increased chroma, or a combination of factors.

The vividness of interpreted colors is correlated with an attribute known as the chroma value of a color. The chroma value is one of the attributes or coordinates of the CIE L*C*h color space. Together with attributes known as hue (h) and lightness (L*), the chroma can be used to define colors that are perceivable in human vision. It has been determined that visual acuity is positively correlated with the chroma values of colors in an image. In other words, the visual acuity of an observer is greater when viewing a scene with high chroma value colors than when viewing the same scene with lower chroma value colors. The spectral attributes of chroma, hue, and/or lightness of an image or a scene are described further herein with reference to FIGS. 3-4B. The visual acuity of an observer with regard to various electronic displays are described further herein with reference to FIG. 5.

An optical filter can be configured to enhance a scene when the scene is viewed through a lens incorporating the optical filter. For example, the optical filter can be configured to increase, decrease, or change chroma, contrast, or other spectral characteristics of the image in order to achieve any desired effect. A chroma-enhancing optical filter can be configured to preferentially transmit or attenuate light within one or more chroma enhancement windows (CEWs), such as, for example, the CEWs described in U.S. Patent Application Publication No. 2013/0141693, the entire contents of which are incorporated by reference herein and made a part of this specification. Any suitable process can be used to determine the desired functionality of the optical filter. For example, the colors predominantly reflected or emitted in a selected environment can be measured, and a filter can be adapted to provide chroma enhancement in one or more spectral regions corresponding to the colors that are predominantly reflected or emitted.

A system for demonstrating functionality of eyewear incorporating an optical filter can display digital imagery on an electronic display that corresponds to the real-world environment and/or features of the real-world environment where the eyewear is designed to be used. The terms "digital imagery" and "digital image" are used herein in their broad and ordinary sense and encompass, for example, any type of image that can be displayed on an electronic display. However, electronic displays have limitations that prevent them from fully replicating the experience of viewing real-world scenery. For example, electronic displays generally do not emit light at the full range of colors visible to a human eye. Many electronic displays are configured or calibrated to use the sRGB color space or a portion of the sRGB color space or another color space incorporating colors that can be reproduced on an electronic display. The sRGB color space defines the chromaticities of the red, green, and blue primaries. The gamut of chromaticities that can be represented in sRGB is the color triangle defined by these primaries. As with any RGB color space, for non-negative values of red, green, and blue, colors cannot be represented outside this triangle. Other color spaces may have different color gamuts, in some cases encompassing a larger range of perceivable colors compared to sRGB. However, other standard color spaces of electronic displays are limited similarly compared to the full range of colors perceivable in normal human vision. As another example, images displayed on an electronic display may not have the same brightness as a natural scene. As a further example, a viewer of an image on a flat electronic display will not experience the same perception of depth as a viewer of a natural scene.

Some electronic displays are configured to display images at a brightness level corresponding to an environment of an observer, for example, an office environment that is well-lit. Further, electronic displays are limited in color selection as compared to the full range of colors that may be perceived by the human eye. This limitation, in short, exists because the phosphors and/or subpixel emission spectra of an electronic display are not the same as the spectral response curves of cones that perceive light in the human eye. Accordingly, with this variation in color and brightness that can vary across various electronic displays for varying environments, the true and/or perceived color of an image displayed on an electronic display for an observer may not be an accurate representation as compared to that same image when viewed in real-life or in a realistic scenario. For example, the snow in an image may appear washed out on electronic display that is limited in its color selection or viewed in an environment with a varying brightness level. Said differently, in a realistic scenario outside, snow may appear to have more depth, with ridges defined on certain slopes; this same scenario depicted in an image on electronic display may not be viewable with this depth and definition. Accordingly, aspects of the present disclosure describe eyewear demonstration systems and methods that can compensate for these limitations and additionally accentuate or highlight aspects of a displayed image.

Some embodiments provide for an image on an electronic display to include one or more wanted color layers that are preferentially transmitted or enhanced by an optical filter in eyewear and one or more unwanted color layers that are preferentially attenuated by the optical filter. In some embodiments, this approach allows a person viewing the electronic display at the demonstration location to experience the functional filtering capability of various types of eyewear even though real-world scenery that the eyewear is intended for is not available for viewing at the demonstration location. The optical filter of the eyewear can be configured to substantially increase the colorfulness, chroma value, clarity, and/or vividness of certain types of real-world scenery. Electronic imagery used by the demonstration system can be configured to resemble the real-world scenery and to include image features that simulate and/or emphasize the functionality of the eyewear when viewing such real-world scenery.

Certain embodiments provide systems and methods for demonstrating eyewear that provide chroma enhancement. Eyewear with chroma enhancement can be any type of eyewear that incorporates an optical filter that increases or otherwise modifies the average chroma value of at least certain types of visual stimuli. Embodiments of eyewear with chroma enhancement are described in U.S. application Ser. No. 13/656,114, entitled EYEWEAR WITH CHROMA ENHANCEMENT, filed Oct. 19, 2012, the entire contents of which are incorporated by reference herein and made a part of this specification.

Digital imagery used by the demonstration system can be described by separating the image into image features or components with different functional purposes. Such features or components can be called image layers or masks, even though digital imagery displayed by the demonstration system may not have layers or masks in the digital image editing sense. The image layers can include an unwanted color layer that includes a spectral power distribution that substantially overlaps an absorbance and/or reflectance peak of the optical filter present in the eyewear to be used with the demonstration system. Accordingly, the unwanted color layer of the image can be substantially and preferentially attenuated when viewed through the eyewear. When viewed with the naked eye or through eyewear with a lens that does not substantially attenuate the unwanted color layer, the unwanted color image layer may obscure details or objects of interest in the image.

The image layers can include a wanted color layer with a spectral power distribution that is not preferentially attenuated by the optical filter. For example, the spectral power distribution may not substantially overlap an absorbance and/or reflectance peak of the optical filter present in the eyewear. In some embodiments, a wanted color layer cooperates spectrally with the optical filter to allow details of interest to be seen and/or accentuated when the image is viewed through the eyewear. For example, the average chroma value of the wanted image layer can be substantially increased when viewed through the eyewear.

The image layers can include a background layer that contains realistic features captured from a natural scene. The background layer can coordinate with the other layers of the image to blend back in the realism of the image and convince the viewer that the image displayed is an accurate representation of real-life scenery.

The image layers can include additional feature layers, such as a sky layer, with a spectral power distribution that is known to be enhanced by the optical filter. For example, when viewed through a chroma enhancement filter, the average chroma value of an additional feature layer can be increased relative to the average chroma value of the feature layer viewed through a neutral density attenuation filter with the same luminous transmittance as the optical filter. Such layers can add to the overall sensation of vividness when the displayed image is viewed through eyewear containing an optical filter with an attenuation profile that coordinates with the additional feature layer(s) to simulate and/or enhance the experience the viewer would have if viewing real-world scenery and/or produce the desired enhancement effect.

In some embodiments, an image is configured to demonstrate the functionality of the optical filter when the image is viewed on an electronic display through a lens that incorporates the optical filter. In certain embodiments, the optical filter can increase, decrease, or otherwise modify spectral attributes of the image displayed on the electronic display. For example, the image can cause the electronic display to display one or more spatial or spectral features (such as, for example, a wanted color layer, an unwanted color layer, a sky layer, and/or an additional feature layer) with luminous emittances that are preferentially transmitted or attenuated by the optical filter. The image can be configured to include image features such that filtering of the display's luminous emittances by the optical filter can achieve a desired visual effect. Desired visual effects can include one or any combination of more than one of the following example visual effects.

First Example Visual Effects

The optical filter coordinates with a displayed image to increase the chroma value of at least a portion of a spatial feature of the displayed image by a noticeable amount, wherein a noticeable amount can be an increase in chroma value greater than or equal to 3%, greater than or equal to 5%, greater than or equal to 10%, greater than or equal to 15%, greater than or equal to 20%, greater than or equal to 25%, and/or less than or equal to 100%, compared to a reference, wherein chroma value is the C* attribute of the CIE L*C*h color space.

Second Example Visual Effects

The optical filter coordinates with a displayed image to increase the contrast between a spatial feature and at least a portion of the image near the spatial feature by a noticeable amount, wherein contrast is a difference in lightness, chroma, hue, and/or luminance that makes the feature distinguishable from its surroundings, wherein a noticeable amount can be an increase in lightness, chroma, and/or hue difference greater than or equal to 3%, greater than or equal to 5%, greater than or equal to 10%, greater than or equal to 15%, greater than or equal to 20%, greater than or equal to 25%, and/or less than or equal to 100%, compared to a reference, wherein lightness, chroma, and hue are the L*, C*, and h attributes of the CIE L*C*h color space, respectively.

Third Example Visual Effects

The optical filter coordinates with a displayed image to attenuate an unwanted spectral feature (such as, for example, an unwanted color portion or layer) by a noticeable amount, wherein a noticeable amount can be an attenuation of the luminous emittance of the spectral feature greater than or equal to 30%, greater than or equal to 50%, greater than or equal to 70%, greater than or equal to 80%, and/or greater than or equal to 90%, within the spectral bandwidth of the feature, compared to a reference, wherein the unwanted spectral feature at least partially obscures at least one object of interest, wherein, in some embodiments, the unwanted spectral feature decreases the average chroma value and/or contrast of an object of interest in the image, and wherein, in some embodiments, a second luminous emittance feature in a second spectral band different from the spectral band of the unwanted feature is attenuated less than or equal to 80%, less than or equal to 70%, less than or equal to 50%, less than or equal to 30%, less than or equal to 20%, and/or less than or equal to the attenuation of the unwanted feature.

Fourth Example Visual Effects

The displayed image includes an unwanted color portion having a spectral power distribution with a luminous emittance peak that substantially spectrally overlaps an absorbance peak of the optical filter located in one or more than one spectral bands, wherein substantial overlap between the spectral power distribution of the unwanted color portion and the absorbance peak comprises an overlap of greater than or equal to 5 nm, greater than or equal to 10 nm, and/or greater than or equal to 20 nm in the bandwidth of the absorbance peak and the bandwidth of a luminous emittance feature in the spectral power distribution, wherein the bandwidth of the absorbance peak is equal to the full width of the peak at 80% of the maximum absorbance of the absorbance peak, and wherein the bandwidth of the luminous emittance feature is equal to the full width of the luminous emittance peak at 80% of the peak's maximum luminance.

Fifth Example Visual Effects

The optical filter cooperates with a displayed image to improve the ability of a human with substantially normal vision to perceive an object of interest in the image compared to a reference.

Sixth Example Visual Effects

The optical filter cooperates with a displayed image to improve the ability of a human with substantially normal vision to perceive an object of interest in the image compared to an optical filter not designed to cooperate with the image to increase differences in hue, chroma, and/or lightness between features of interest and their surroundings.

The reference in any of the foregoing example visual effects can be a neutral density attenuation filter with the same luminous transmittance as the optical filter or an unfiltered view of the displayed image (for example, viewing the displayed image with the naked eye).

FIG. 1A illustrates a system for demonstrating functionality of eyewear with an optical filter using an electronic display displaying an image configured to emphasize and/or simulate the functionality of the optical filter when viewing at least certain types of natural scenery through the eyewear. A demonstration location 100, such as a retail store with merchandise (e.g., eyewear), can include a demonstration system with an electronic display 104 displaying an image 106. A customer or user of the demonstration system can wear eyewear 102 and observe desired visual effects, which improve or otherwise change the image 106 displayed on the electronic display 104. The eyewear 102 includes an optical filter that filters an image displayed on the electronic display 104 to achieve the desired visual effects.

The electronic display 104 can be an LCD monitor, an OLED monitor, a CRT monitor, or any other monitor or electronic display capable displaying electronic imagery. The electronic display 104 can part of a smart phone, a tablet, a computer system, or any device that includes an electronic display which may also be capable of input by the user. In certain embodiments, the electronic display 104 can be a touch-screen device, a touch-screen monitor, or a wearable electronic device with an electronic display. In some embodiments, the electronic display 104 has some or all of the following features:

a. a hardware resolution and physical dimensions that result in a pixel density of greater than or equal to about 100 pixels per inch (PPI), greater than or equal to about 150 PPI, and/or greater than or equal to about 250 PPI, wherein PPI corresponds to spatial resolution (for example, the number of independent pixel values per unit length) of the electronic display;

b. a capability of displaying imagery with a luminance greater than or equal to about 300 candelas per square meter ($cd/m^2$) and/or greater than or equal to about 400 $cd/m^2$;

c. a color gamut greater than or equal to 70% of sRGB and/or greater than or equal to 80% of sRGB; and/or d. a diagonal dimension of greater than or equal to 1 inch, greater than or equal to 5 inches, and/or greater than or equal to 8 inches.

In some embodiments, the image 106 displayed on the electronic display 104 has image features that de-emphasize objects of interest in the image 106 and/or image features with a chroma value that can be increased by attenuating a portion of the feature's spectral power distribution within a spectral window. The image 106 can be a still image or one or more images displayed sequentially in time on the electronic display, such as a slideshow or video. The image displayed on electronic display 104 can be a high-resolution image, a high-definition video, or any other image or video format that is capable of being output on the electronic display 104.

In certain embodiments, the image 106 displayed on the electronic display 104 includes one or more layering masks configured to hide or accentuate certain colors when the image 106 is viewed through the optical filter of the eyewear 102. In various embodiments, the electronic display 104 produces luminous emittance peaks when displaying the image 106 that at least partially overlap with absorbance peaks of the optical filter's absorbance profile. The optical filter can modify (e.g., increase or decrease) the contrast or chroma value of features in the image 106, thereby emphasizing or deemphasizing objects of interest or other image features.

In some embodiments, features of an image 106 can be described as one or more layers that have different functional significance when used in a system for demonstrating features of eyewear 102 with an optical filter. Although this disclosure may describe an image 106 as "layered," this is not meant to imply or require that the image displayed on the electronic display 104 actually contains layers (in the digital image editing sense); rather, descriptions of image layers is used herein to analytically describe the interaction or non-interaction of various image features or components with an optical filter when the image is viewed through the optical filter. An image 106 shown on the electronic display 104 of the demonstration system can be a flat or single-layer image but still have the features described hereinafter.

In an example scenario, the demonstration location 100 can include an electronic display 104 displaying an image of a snow environment. The brightness of the image displayed on the electronic display 104 may be much lower than the brightness of the associated real-world scenery if, for example, the associated scenery was outdoors on a snow covered ridge on a bright sunny day. In the real world, an optical filter for snow sports incorporated into ski goggles may highlight the appearance of crevices and ridges to an observer of the snow. In the demonstration location 100, where a digital image 106 of the scenery is viewed on an electronic display not capable of replicating the brightness of direct sunlight and/or not capable of replicating other aspects of real world scenery, the effect of highlighting the appearance of tracks and ridges in the snow may not be perceivable to the viewer with the same eyewear 102. In some embodiments, the image 106 is modified to include layers that compensate for the limitations of the electronic display. For example, details of interest in the image can be obscured using an unwanted color layer. When the image is viewed through the eyewear 102, such details of interest can be revealed or enhanced because the optical filter of the eyewear 102 attenuates the unwanted colors that obscure the details.

In some embodiments, the eyewear 102 can include an optical filter that accentuates details that are obscured or lack colorfulness or vividness in the unfiltered image 106. In certain such embodiments, the image 106 can create a viewing experience that reflects a realistic scenario (e.g., outdoors on a snow covered ridge as perceived by the human eye). For example, the image 106 can include layers that interact with the optical filter in ways that resemble real-world scenery. In other embodiments, the image 106 can create a viewing experience that emphasizes the functional attributes of the optical filter, including in ways that are not necessarily seen in a realistic scenario. Using one or both approaches, the image can be configured to permit the image viewer to have an enhanced view of the detailed ridges and crevices in the snow when the viewer is wearing eyewear with an appropriate optical filter.

Figure 1B:
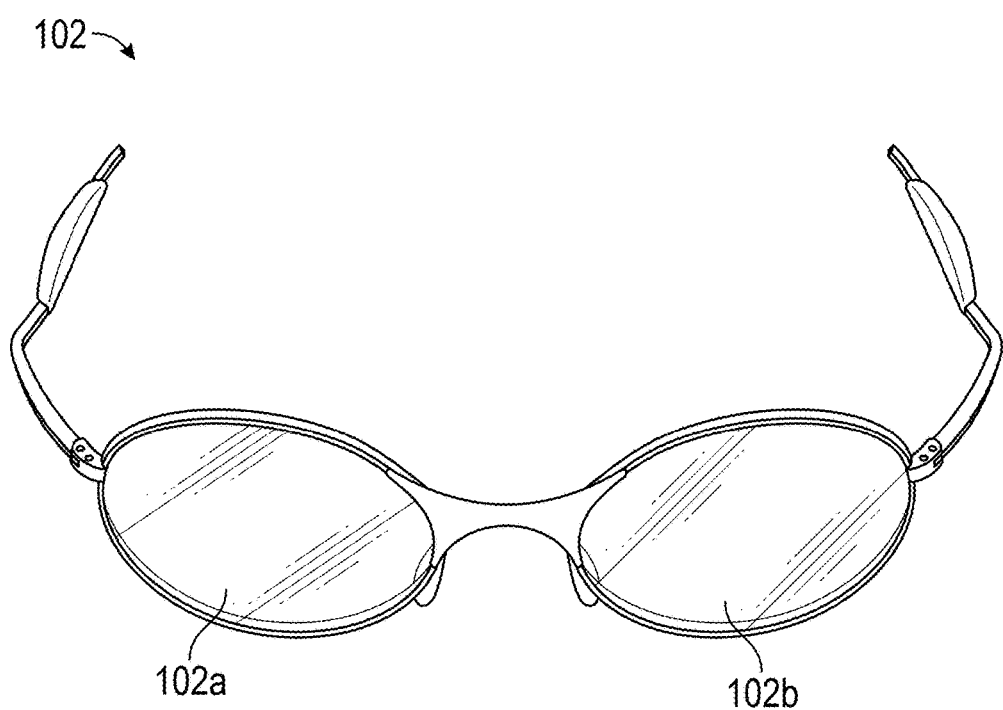
FIG. 1B is a perspective view of a pair of spectacles incorporating lenses with an optical filter.

In the embodiment illustrated in FIG. 1B, eyewear 102 includes lenses 102a, 102b having an optical filter, such as, for example, a chroma enhancement filter. The chroma enhancement filter generally changes the colorfulness of a scene viewed through one or more lenses 102a, 102b, compared to a scene viewed through a lens with a neutral density attenuation filter having the same luminous transmittance as the chroma enhancement filter. The eyewear can be of any type, including general-purpose eyewear, special-purpose eyewear, sunglasses, goggles, driving glasses, sporting glasses, indoor eyewear, outdoor eyewear, vision-correcting eyewear, contrast-enhancing eyewear, eyewear designed for another purpose, or eyewear designed for a combination of purposes.

Figure 2A:
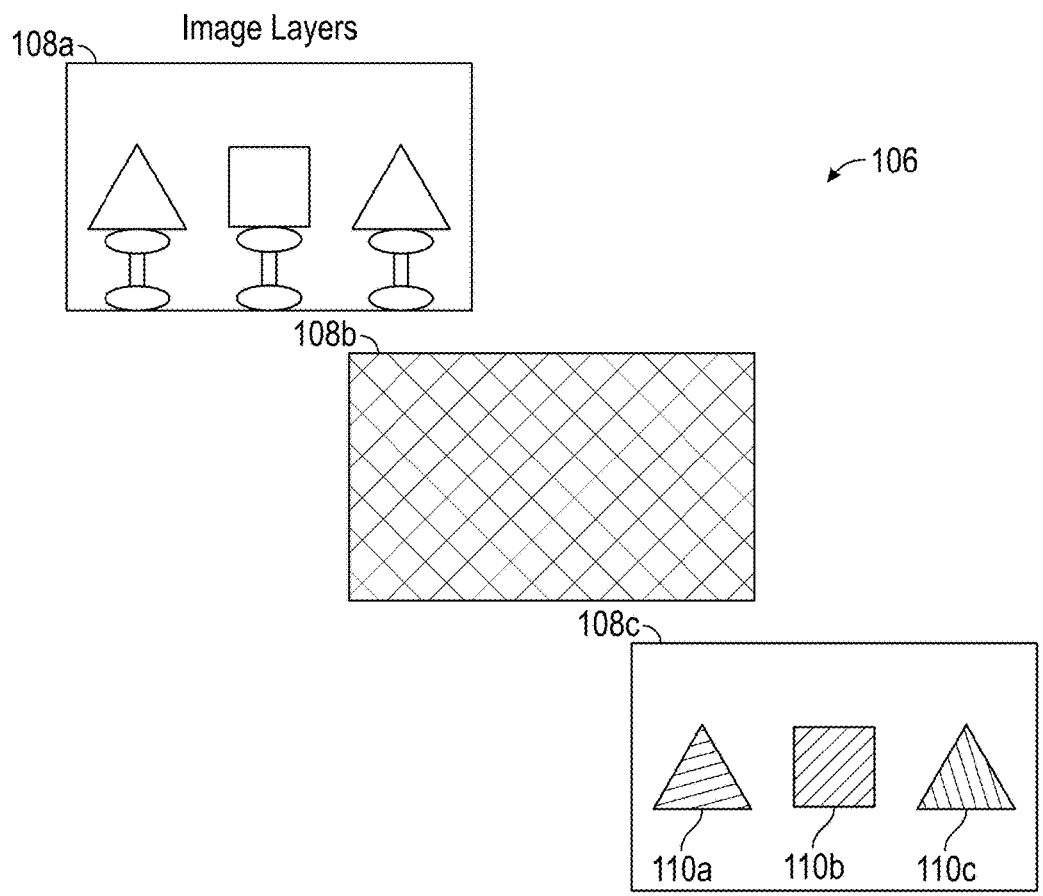
FIG. 2A shows a layered image adapted for viewing on an electronic display to demonstrate the functionality of eyewear incorporating an optical filter.

FIG. 2A shows a layered image 106 with a background layer 108a, an unwanted color layer 108b, and a wanted color layer 108c. The background layer 108a can include at least some realistic details of the image, including at least some details and/or shapes that are recognizable as real-world scenery. Certain details of objects of interest 110a-c, such as, for example, at least certain colors and/or textures associated with the objects of interest 110a-c, may not be included in the background layer 108a. In certain embodiments, a layered image does not include a background layer or includes a background layer and/or one or more other layers with only geometric shapes and/or other details that are not based on real-world scenery.

The unwanted color layer 108b can contain colors and/or textures that obscure and/or reduce the contrast of objects of interest 110a-c and/or other features of the image. The spectral power distribution of the colors and/or textures in the unwanted color layer 108b can substantially correspond to absorbance peaks of the optical filter in the eyewear 102 that the image 106 is intended to be used with. The wanted color layer 108c can contain details, such as, for example, colors and/or textures, of the objects of interest 110a-c. The spectral power distribution of the wanted color layer 108c can be preferentially transmitted by the optical filter of the eyewear 102 intended for use with the image 106. For example, the wanted color layer 108c can be attenuated less than or equal to 80%, less than or equal to 70%, less than or equal to 50%, less than or equal to 30%, less than or equal to 20%, and/or less than or equal to the attenuation of the unwanted color layer 108b.

Figure 2B:
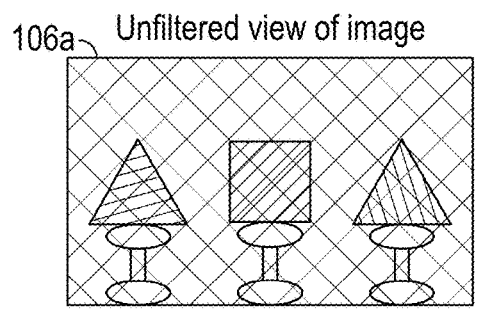
FIG. 2B shows a composite, unfiltered view of the layered image of FIG. 2A.

FIG. 2B illustrates an unfiltered view 106a of the image 106 shown in FIG. 2A, as displayed on an electronic display. The vividness and/or contrast between the objects of interest 110a-c and their surroundings are substantially reduced by the presence of the unwanted color layer 108b. Because the objects of interest 110a-c are obscured, the viewer may have difficulty discerning the details of the objects of interest 110a-c.

Figure 2C:
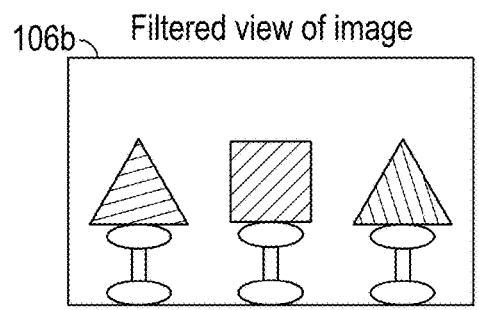
FIG. 2C shows a composite, filtered view of the layered image of FIG. 2A.

FIG. 2C illustrates a filtered view 106b of the image 106 shown in FIG. 2A, where the image 106 displayed on an electronic display is viewed through eyewear 102 with an optical filter having one or more spectral features that, for example, attenuate the colors and/or textures of the unwanted color layer 108b. The contrast between the objects of interest 110a-c and their surroundings is substantially increased.

In various embodiments, the eyewear 102 can accentuate aspects of the image 106 displayed on electronic display 104. In some embodiments, the optical filter is configured to increase the average chroma value of the objects of interest 110a-c and/or other features of the image 106.

Some embodiments include an image with a geometric pattern displayed on an electronic display. In certain such embodiments, the image includes an Ishihara Test-style pattern that demonstrates the functionality of an optical filter. An unwanted color layer of the image can obscure details of interest such as, for example, shapes, letters, numbers, and/or other details. In some embodiments, the unwanted color layer obscures details of interest by reducing differences in hue, lightness, and/or chroma between the details of interest and their surroundings. The image can be configured such that when it is viewed on an electronic display through an associated optical filter used in eyewear, the hue, lightness, and/or chroma of the details of interest are changed to be more distinct from their surroundings by attenuating at least a portion of the unwanted color layer. An image can be considered associated with an optical filter when, for example, the optical filter attenuates the unwanted color layer to a greater degree than the wanted color layer. This feature of the optical filter can create an effective demonstration when preferentially attenuating the unwanted color layer increases the contrast between details of interest and their surroundings. For example, such contrast can be increased by increasing differences in hue, lightness, and/or chroma between the details of interest and their surroundings.

Figure 3:
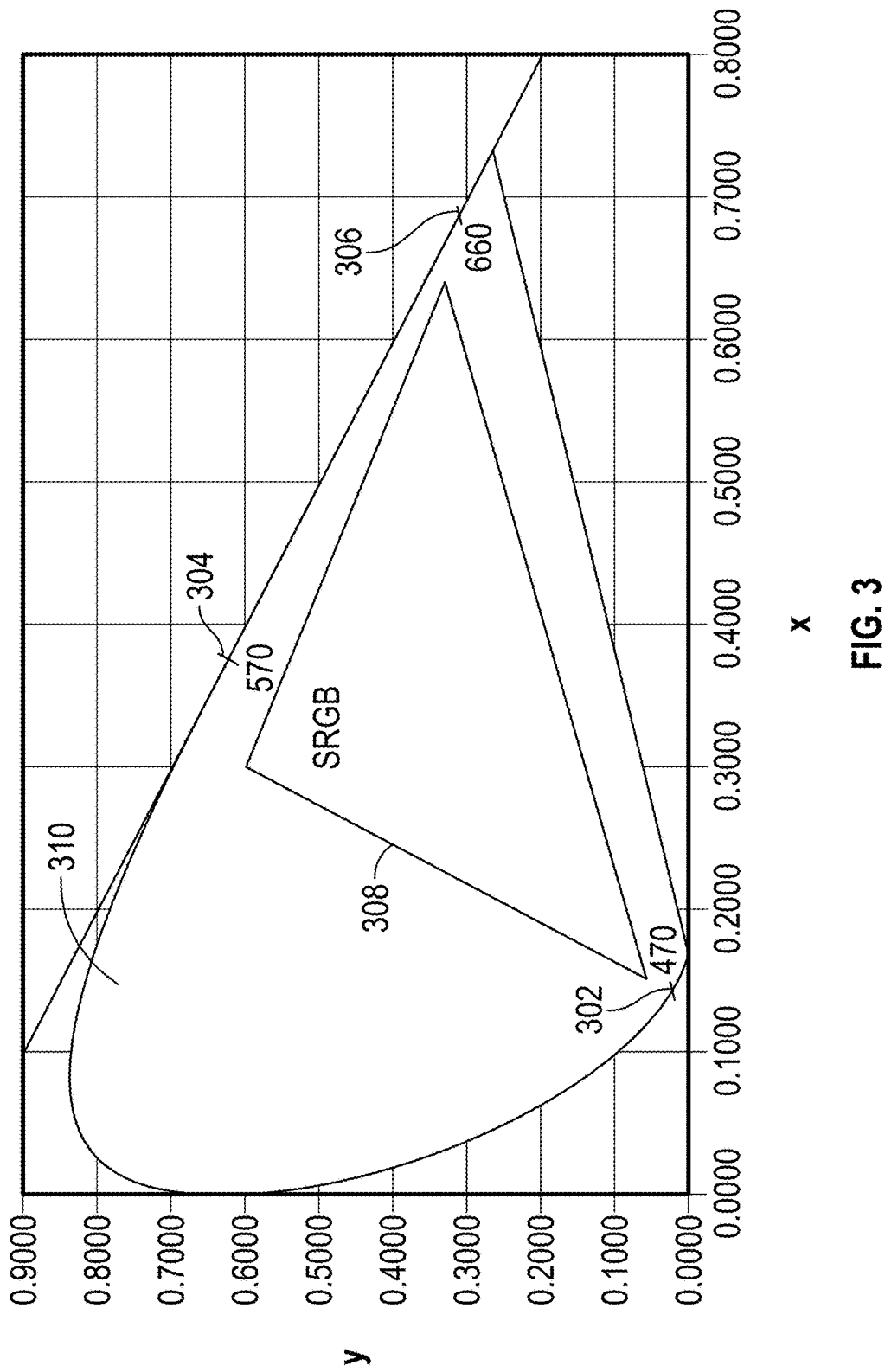
FIG. 3 is a CIE 1931 color space chromaticity diagram overlaid with the sRGB color space.

FIG. 3 is a CIE 1931 color space chromaticity diagram overlaid with the sRGB color space commonly used as a color space for electronic displays. The human vision system can perceive the colors in the color space 310 defined by the 1931 CIE XYZ color space and described further herein. The curved edge of the color space 310 is called the spectral locus and corresponds to monochromatic light, with wavelengths listed in nanometers. For example, the 470 nm wavelength 302 along the spectral locus corresponds to narrow-bandwidth blue light. The 570 nm wavelength 304 along the spectral locus corresponds to narrow-bandwidth yellow light. The 660 nm wavelength 306 along the spectral locus corresponds to narrow-bandwidth red light. Colors corresponding to these identified locations 304, 306, and 302 along the spectral locus cannot be displayed by an electronic display using the sRGB color space 308. The triangle bounding the sRGB color space 308 shows the coordinates of primaries connected by straight lines.

To design a filter that increases chroma for an array of colors, one can account for the mechanisms involved in the eye's perception of color. The photopically adapted eye (e.g., the vision of the human eye under well-lit conditions) shows peak sensitivities at 440, 545, and 565 nm. These peak sensitivities correspond to each of three optical sensors found in the eye's retina known as cones. The location and shape of the cone sensitivity profiles have been measured with substantial accuracy in Stockman and Sharpe, "The Spectral Sensitivities of the Middle- and Long-Wavelength-Sensitive Cones Derived From Measurements in Observers of Known Genotype," Vision Research 40 (2000), pp. 1711-1737, which is incorporated by reference herein and made a part of this specification.

The cone sensitivity profiles can be converted from sensitivity data to quantities describing color such as, for example, the CIE tristimulus color values. In some embodiments, the CIE tristimulus color values are used to design an optical filter. For example, the CIE color values can be used to calculate the effect of an optical filter on perceived color using values of chroma, C*, in the CIE L*C*h color space.

The human cone sensitivities can be converted to the 1931 CIE XYZ color space using the linear transformation matrix M described in Golz and Macleod, "Colorimetry for CRT displays," J. Opt. Soc. Am. A vol. 20, no. 5 (May 2003), pp. 769-781, which is incorporated by reference herein and made a part of this specification.

The colors observed in the physical world are interpreted by the human brain from luminous stimuli of varying bandwidths. To simulate the human vision system and then calculate the effects of an optical filter, filtered and non-filtered bands of light are used as input to the cone sensitivity space.

When inputting a spectrum of light to the cone sensitivity space, the mechanism of color recognition in the human eye can be accounted for. Color response by the eye is accomplished by comparing the relative signals of each of the three cones types: S, M, and L. To model this with broad band light, a sum of the intensities at each wavelength in the input spectrum is weighted according to the cone sensitivity at that wavelength.

Normalized weighted light intensities for all three cone types can then be converted to the 1931 CIE XYZ color space via a linear transformation matrix, M. This conversion facilitates further conversion to the 1976 CIE L*a*b* color space and the subsequent conversion to the CIE L*C*h color space to yield chroma values.

To simulate the effect of a filter placed between the eye and the physical world, an input band of light can be modified according to a prospective filter's absorption characteristics. The weighted light intensity is then normalized according to the total sum of light that is transmitted through the filter.

In certain embodiments, to test the effect of a filter on various colors of light, the spectral profile, or at least the bandwidth, of an input is determined first. The appropriate bandwidth for the model's input is typically affected by image or portions of an image to be filtered. A reasonable bandwidth for an image can be about 30 nm, since this bandwidth represents the approximate bandwidth of many colors perceived in a natural environment. Additionally, 30 nm is a narrow enough bandwidth to permit transmitted light to fall within responsive portions of the cone sensitivity functions, which are approximately twice this bandwidth. A filter designed using a 30 nm input bandwidth will also improve the chroma of colors having other bandwidths, such as 20 nm or 80 nm. Thus, the effect of a filter on chroma can be determined using color inputs having a 30 nm bandwidth or another suitable bandwidth that is sensitive to a wide range of natural color bandwidths.

Other bandwidths are possible. The bandwidth can be significantly widened or narrowed from 30 nm while preserving the chroma-enhancing properties of many filter designs. The 30 nm bandwidth described above is representative of wider or narrower input bandwidths that can be used to produce desired features of an optical filter. The term "bandwidth" is used herein in its broad and ordinary sense. This disclosure sets forth several techniques for characterizing the bandwidth of a spectral feature. Unless otherwise specified, any suitable bandwidth characterization disclosed herein can be applied to define the spectral features identified in this specification. For example, in some embodiments, the bandwidth of a peak encompasses the full width of a peak at half of the peak's maximum value (FWHM value) and any other commonly used measurements of bandwidth.

In some embodiments, an optical filter is designed by using spectral profiles of candidate filters to calculate the effect of the candidate filters on chroma. In this way, changes in the filter can be iteratively checked for their effectiveness in achieving a desired result. Alternatively, filters can be designed directly via numerical simulation. Examples and comparative examples of optical filters and the effects of those optical filters on chroma are described in U.S. Patent Application Publication No. 2013/0141693, the entire contents of which are incorporated by reference herein and made a part of this specification.

One goal of filter design can be to determine the overall color appearance of an image. The impact of overall color adjustments to the filter design can be calculated using a suitable model. In some cases, color adjustments can be made with some, little, or no sacrifice to the chroma characteristics being sought. In some embodiments, an object of interest has an overall color with a relatively low average chroma value. For example, the object can have an average chroma value of less than 60. A chroma-increasing optical filter used in such a lens can provide increased colorfulness for at least some colors as compared to when the image is perceived by the naked human eye, with the average chroma value being higher compared to a neutral density attenuation filter with the same luminous transmittance of the chroma enhancement filter.

In some embodiments, an optical filter is configured to increase or maximize chroma in the blue to blue-green region of the visible spectrum. A filter with such a configuration can have an absorbance peak with a midpoint centered at a wavelength greater than or equal to about 440 nm and/or less than or equal to about 490 nm. Any suitable measure of the bandwidth can be used. The full width of the absorbance peak at 80% of the maximum absorbance can about 20 nm. However, other absorbance peak widths can be used, including bandwidths greater than or equal to about 10 nm, greater than or equal to about 15 nm, greater than or equal to about 20 nm, less than or equal to about 60 nm, less than or equal to about 50 nm, less than or equal to about 40 nm, between about 10 nm and about 60 nm, and/or between any of the other foregoing values. The bandwidth of an absorbance peak can be measured in any suitable fashion. For example, the bandwidth of an absorbance peak can include the full width of a peak at 80% of the maximum, the full width of a peak at 90% of the maximum, the full width of a peak at 95% of the maximum, or the full width of a peak at 98% of the maximum.

The spectral features of an optical filter can also be evaluated by considering the transmittance profile of the filter and/or a lens incorporating the filter. In some embodiments, the bandwidth and/or attenuation factors of transmittance valleys can be measured. The bandwidth of a transmittance valley can be defined, for example, as the full width of the valley at a certain transmittance, such as 2%, 5%, 10%, or 20%. In certain embodiments, the bandwidth of a transmittance valley is defined as the full width of the valley at 1.5 times, two times, four times, ten times, or one hundred times the minimum transmittance. In some embodiments, the bandwidth of a transmittance valley is defined as the full width of the valley at a certain offset from the minimum transmittance, such as, for example, the minimum transmittance plus 1% transmittance, plus 2% transmittance, plus 5% transmittance, plus 10% transmittance, or plus 20% transmittance. The attenuation factor of a transmittance valley can be calculated by dividing the area between 100% and the transmittance profile curve by the bandwidth, within the spectral bandwidth of the transmittance valley. Alternatively, the attenuation factor of a transmittance valley can be calculating by finding the absorptance within the bandwidth by subtracting the area under the transmittance curve from 1 and dividing the result by the bandwidth.

Figure 4A:
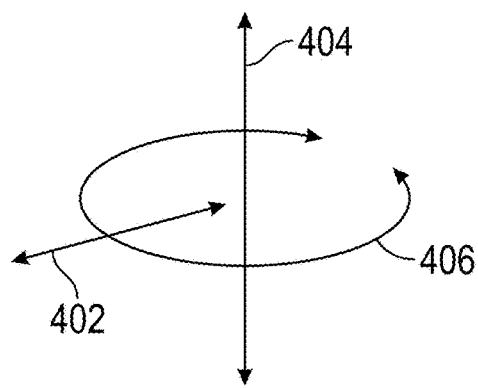
FIG. 4A shows the coordinate axes of the Munsell color system.
Figure 4B:
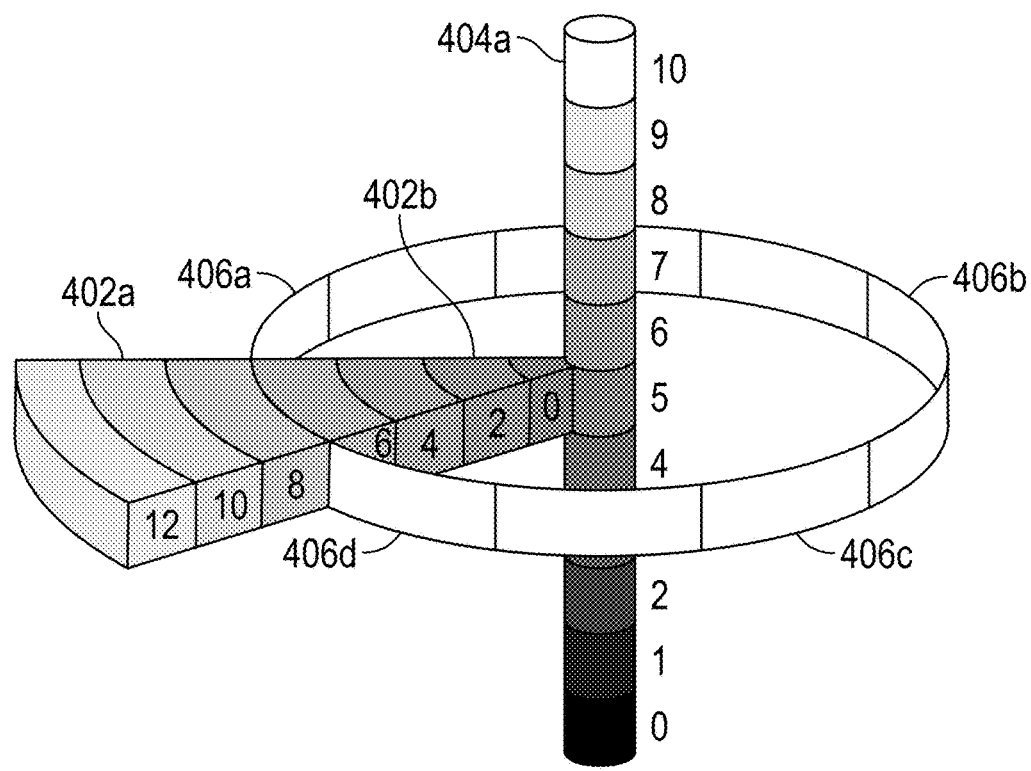
FIG. 4B is a three dimensional representation showing a portion of the Munsell color system.

FIG. 4A is a three dimensional representation of the Munsell color system. The Munsell color system uses three spectral attributes of color: chroma 402, lightness 404, and hue 406. These spectral attributes define a color that may be emitted from an electronic display using the sRGB color space 308 or the spectral attributes 402, 404, and 406 can also represent the color space 310 perceived by the human eye FIG. 4B is a three dimensional graph of the Munsell color system. A spectral attribute can include a scale, for example, chroma 402a lies on the chroma scale and represents a hue with a specified level of colorfulness. Chroma 402b represents a less colorful region of the same hue as it nears the origin axis. The lightness scale can extends from white at lightness 404a to black as depicted at the 0 value in FIG. 4B.

Still with reference to FIG. 4B, the hue scale can represent a variety of colors. For example, hue 406a represents a red/purple region; hue 406b represents a yellow region; hue 406c represents a green region; and hue 406d represents a blue region. As one of skill in the art can recognize, the chroma, lightness and hue scales in the Munsell color system can represent a variety of colors capable of being represented in a color space such as the sRGB color space 308 or the color space 310 perceived by the human eye.

FIG. 5 is a table showing preferred minimum viewing distances for various electronic displays. The hardware resolution, as expressed in pixel density (calculated by pixel size and size of the electronic display), of any electronic display has an upper and lower limit based on the ability of the human eye to resolve a particular electronic display's hardware resolution. Generally, the human eye can resolve a visual angle of 1 arc minute (0.0167 degrees). Based on the visual angle of light received from the electronic display and the pixel density, a preferred minimum viewing distance for an electronic display can be determined. Several example electronic displays and associated preferred minimum viewing distances are shown in FIG. 5. For example, the Electronic Display 1 has a visual angle of 0.0059 degrees, a pixel density calculated from the pixel size of $7.8*10^{-5}$ m, and an electronic display size of 4 in. These values can be used to determine an preferred minimum viewing distance of 6.2 in. Accordingly, an optical filter can be designed for each electronic display that modifies the spectral attributes of an image or a portion of an image based at least in part on the visual angle, pixel density, or the determined preferred minimum viewing distance.

Figure 6A:
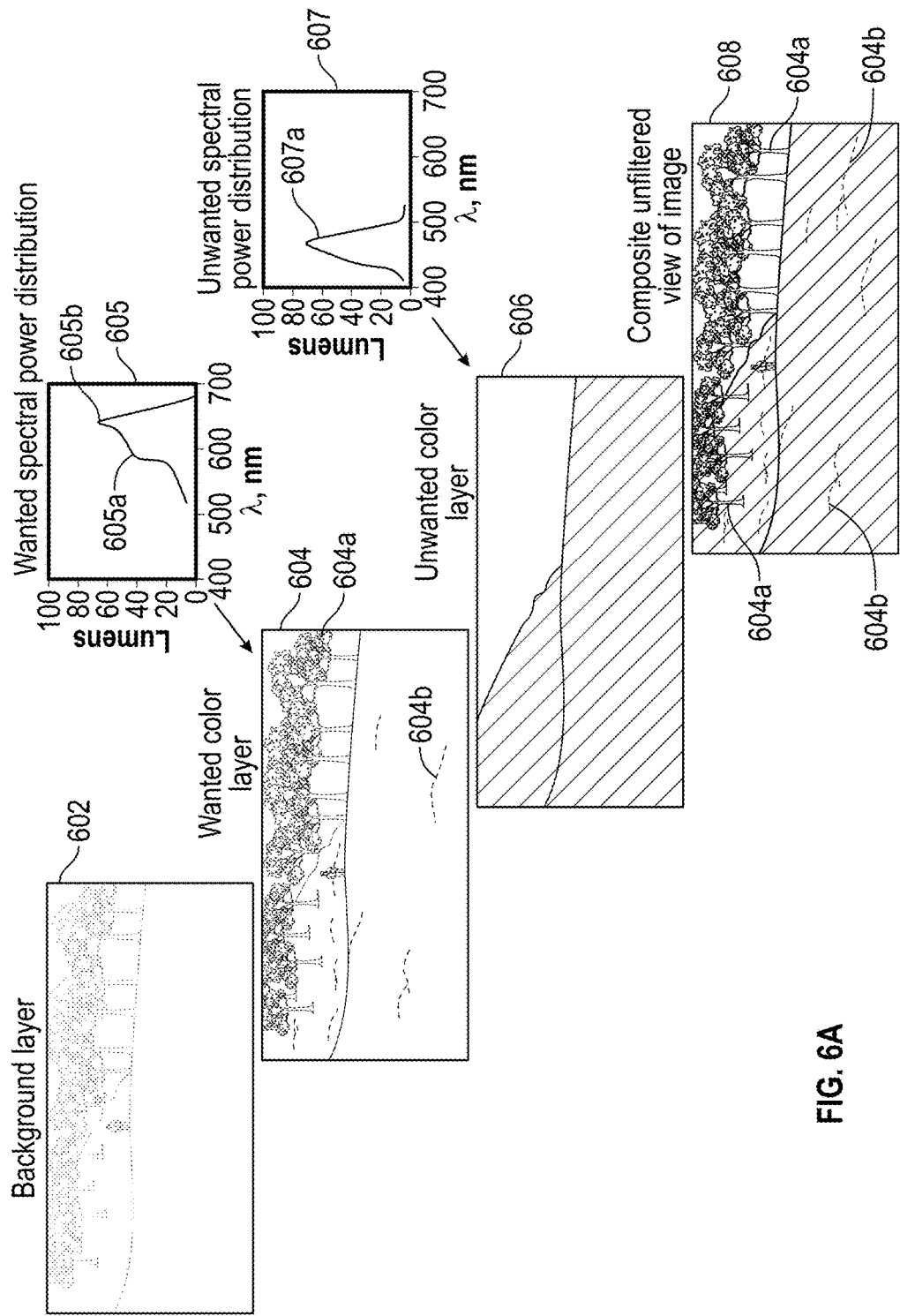
FIG. 6A shows a layered image of a scene adapted for demonstrating the functionality of snow sports eyewear on an electronic display.

FIG. 6A illustrates an example embodiment of a layered image configured to be displayed on an electronic display as part of a system for demonstrating eyewear containing an optical filter. Image layer 602 shows a background layer of a winter scene with snow, trees, and a skier. In addition, image layer 602 does not contain details of the snow (e.g., ridges or crevices), which are features of interest to a skier. The background layer 602 includes features, such as snow, trees, and a person near a ridge, that are realistic and convincing representations of real-world scenery.

Image layer 604 shows a wanted color layer. The wanted color layer 604 includes details of the trees 604a and snow contours 604b that are of interest to a skier. A spectral power distribution 605 adjacent to the wanted color layer 604 shows that the luminous emittance of the wanted color layer 604 is concentrated in the yellow and red regions of the visible spectrum. In general, the spectral power distribution of a wanted color layer can be concentrated in spectral regions where the associated optical filter has relatively strong transmission or low absorbance. In the spectral power distribution 605 of the wanted color layer 604, a luminous emittance ridge 605a is found near 590 nm and a luminous emittance peak 605b is centered near 650 nm. The first and second example visual effects disclosed above are examples of visual effects that can be achieved when an image with a wanted color layer is viewed through an associated optical filter.

Image layer 606 shows an unwanted color layer. The unwanted color layer 606 adds a layer of color to the image that is strongly attenuated by the corresponding optical filter. A spectral power distribution 607 adjacent to the unwanted color layer 606 shows that the luminous emittance of the unwanted color layer 606 is concentrated in the blue region of the visible spectrum. In general, the spectral power distribution of an unwanted color layer can be concentrated in spectral regions where the associated optical filter has relatively high absorbance or weak transmission. In the spectral power distribution 607 of the unwanted image layer 606, a luminous emittance peak 607a is centered near 470 nm. This luminous emittance peak 607a, when combined with the yellow and red luminous emittance features 605a, 605b of the wanted image layer, tends to obscure the snow features 604b of interest to the skier as the combined effect of the luminous emittance features is to reduce the contrast (for example, the difference in hue, chroma, and/or lightness) between the snow contours 604b and their white snow surroundings. The third and fourth example visual effects disclosed above are examples of visual effects that can be achieved when an image with an unwanted color layer is viewed through an associated optical filter.

The image 608 shows a composite image showing the layers 602, 604, and 606 displayed together on an electronic display in an unfiltered view. In the unfiltered view, the ridges and crevices of the snow are difficult to distinguish from the background snow imagery.

Figure 6B:
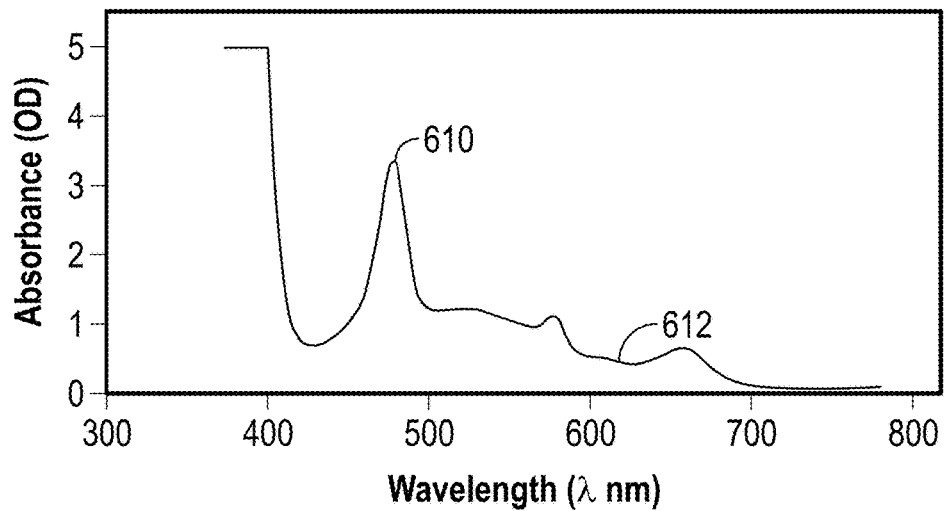
FIG. 6B is an absorbance profile of eyewear with functionality that can be demonstrated using the image of FIG. 6A.

Continuing in the same example, FIG. 6B is a graph of the absorbance profile of an optical filter incorporated into a lens for eyewear. The image 608 is configured to demonstrate the functionality of the optical filter shown in FIG. 6B. Data point 610 references an absorbance peak centered near 473 nm. This absorbance peak has substantial spectral overlap with the luminous emittance of the unwanted color layer 606. Data point 612 references a region of relatively low absorbance and high transmission extending at least between about 580 nm and about 650 nm. This region of relatively low absorbance has substantial spectral overlap with the luminous emittance of the wanted color layer 604.

Figure 6C:
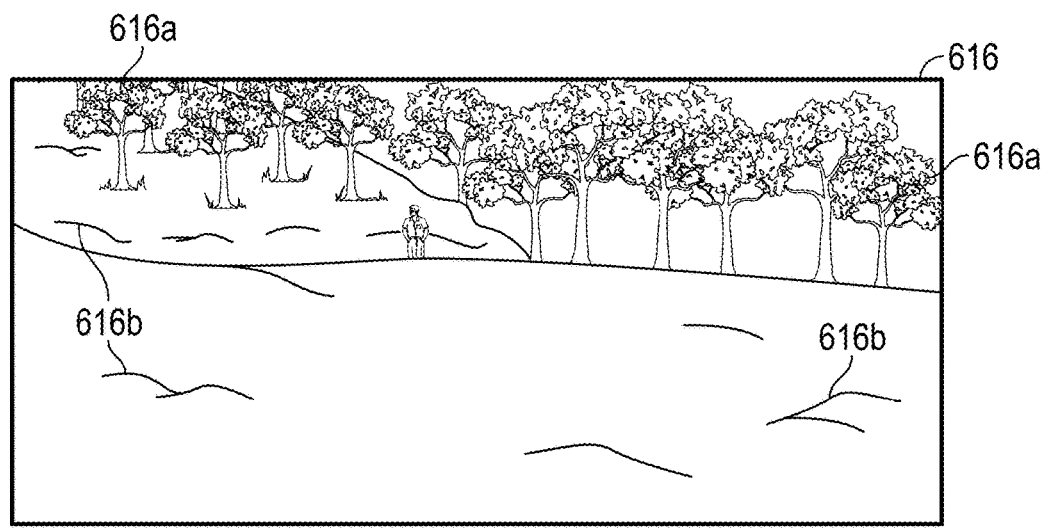
FIG. 6C shows a composite, filtered view of the layered image of FIG. 6A.

FIG. 6C shows a composite image 616 showing the layers 602, 604, and 606 displayed together on an electronic display in a view filtered by the optical filter of the eyewear. The image 616 includes more details that are more readily discerned and identified compared to the unfiltered view of the same image 608. For example, image 616 includes the details 616a showing the trees with more detail than the image 608. Image 616 also includes ridges 616b that are further highlighted or accentuated as compared to the image 608 with ridges 608b. The ridges 616b are further emphasized in the image, only viewable when using eyewear with an optical filter, such as the optical filter profiled in FIG. 6B.

Some embodiments provide a method of preparing an image for demonstrating features of eyewear on an electronic display. The method includes preparing each of the image layers shown in FIGS. 6A-6C, displaying the composite image on an electronic display, and providing eyewear with an optical filter adapted for use with the image to demonstrate the functionality of the eyewear.

Figure 7A:
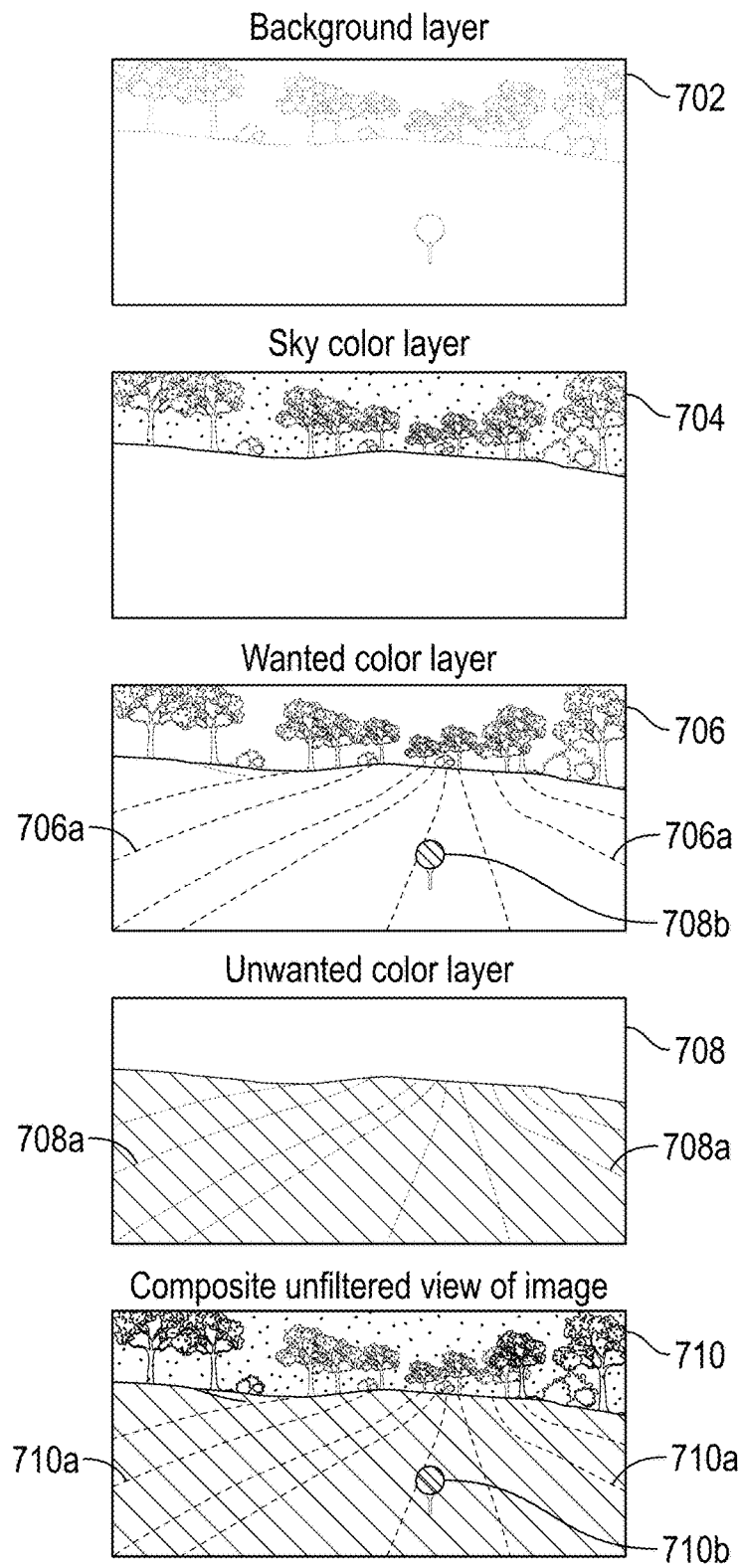
FIG. 7A shows a layered image of a scene adapted for demonstrating the functionality of golfing eyewear on an electronic display.

FIG. 7A illustrates another example embodiment of a layered image that can be displayed on an electronic display in a system for demonstrating eyewear containing an optical filter. A first image layer 702 shows a background layer that includes some realistic features of a golf course scene. The image includes a foreground, midground, and background. The foreground includes a golf ball on a tee, the midground includes the golf green, and the background includes trees. Certain details of the ball, the green, and the trees may not be included in the image layer 702. The layered image can include additional layers that can modify the spectral attributes of the background image so that the image layer 702 can demonstrate how eyewear with a golf-specific optical filter can create a more vivid and colorful scene. The foreground and the midground do not have many details or aspects in the background layer 702. Layers can be added so that different portions of the image layer 702 can be enhanced when the image is viewed through an optical filter. Examples of enhancements can include increasing or decreasing the chroma, hue, and/or lightness of features in the foreground and midground, attenuating an unwanted color layer that obscures such features, and/or transmitting a wanted color layer that contains features of interest to a golfer when the image is viewed through eyewear with a golf-specific optical filter.

A second image layer 704 provides details for features in the background region of the image. This layer 704 can be referred to as a sky layer, an additional feature layer, and/or a wanted color layer. The sky layer can have a spectral power distribution with a characteristic chroma value. The golf-specific optical filter of the corresponding eyewear can be configured to narrow the bandwidth of a luminous emittance peak to increase the chroma value of the sky and/or additional features in the background. When viewed on an electronic display through a golf-specific optical filter, the chroma of the sky can be increased compared to a reference. In some embodiments, the trees can also have more apparent detail compared to a reference. Accordingly, viewing the image on an electronic display through eyewear having the golf-specific optical filter can make the background region more colorful and vivid.

A third image layer 706 provides details for features of interest in the midground and foreground regions. The layer 706 can be referred to as an additional feature layer and/or a wanted color layer. For example, the midground includes shading for contours 706a of a golf green, wherein the shading has a spectral power distribution with a characteristic chroma, hue, and lightness. In this example, the shading can include a luminous emittance feature within the orange and/or red region of the visible spectrum. For example, the spectral power distribution of the shading can include a red luminous emittance peak centered near 670 nm. When the image is displayed on an electronic display and viewed through a corresponding optical filter, the optical filter can change the chroma, hue, and/or lightness of the shading by preferentially transmitting the shading while attenuating one or more other spectral bands within the same spatial regions of the image. The midground of the image layer 706 includes details such as contours 706a in the golf green, while the midground in image 702 shows little or no such detail. In addition, the foreground of the image layer 706 includes additional detail of the golf ball 706b. When viewed on an electronic display through a golf-specific optical filter, these details of the midground and foreground can have modified chroma, hue, and/or lightness that increase the contrast with their surroundings compared to a reference. Accordingly, viewing the image on an electronic display through eyewear having the golf-specific optical filter can make the midground and foreground details of the image more noticeable.

A fourth image layer 708 modifies the spectral attributes of features in the midground and foreground regions. The layer 708 can be referred to as an unwanted color layer. The unwanted color layer 708 adds a luminous emittance feature to the image that is strongly attenuated when the image is viewed on an electronic display through eyewear comprising a corresponding optical filter. In the spectral power distribution of the unwanted color layer 708, a luminous emittance peak can be centered in the blue region of the visible spectrum. An unwanted color layer 708, when combined with the red luminous emittance of the wanted color layer 706, tends to obscure the golf green contours 708a as compared to the wanted color layer 706. The unwanted color layer 708 can be attenuated by a golf-specific optical filter. When a viewer views the image on an electronic display with eyewear incorporating a golf-specific optical filter, the midground can appear more colorful and vivid and details such as the golf green contours can stand out more compared to a reference.

The composite unfiltered image 710 includes the layers 702, 704, 706, and 708 displayed together on an electronic display in an unfiltered view. In the unfiltered view, the golf green contours 710a are more difficult to distinguish from their surroundings compared to the filtered view. Further, the golf ball 710b lacks clarity and contrast that distinguishes the golf ball from the midground region.

Figure 7B:
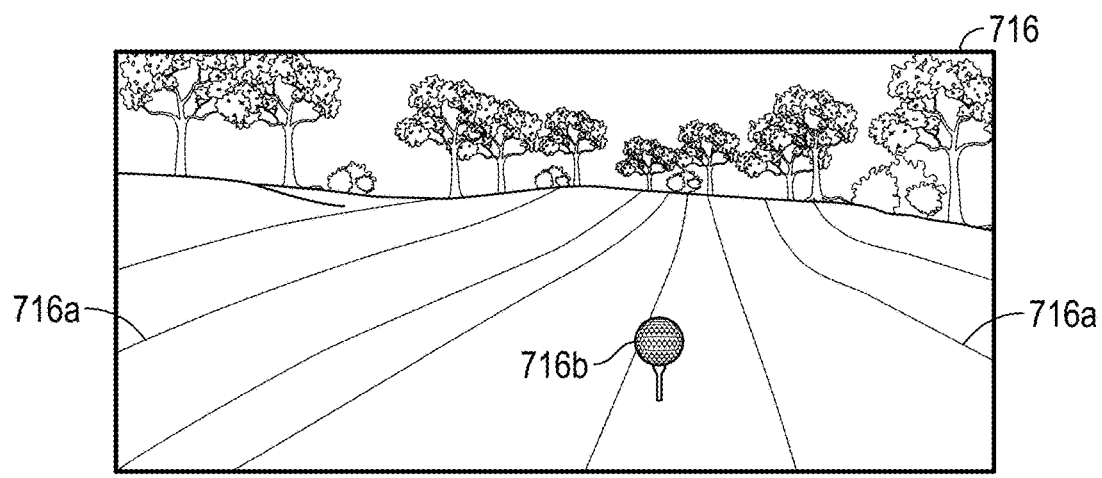
FIG. 7B shows a composite, filtered view of the layered image of FIG. 7A.

FIG. 7B shows a composite image 716 showing the layers 702, 704, 706, and 708 displayed together on an electronic display in a view filtered by the optical filter of the eyewear. The image 716 includes details that are more readily discerned compared to the unfiltered view 710 of the same image. For example, the filtered image 716 shows the golf green contours 716a with more detail than the contours 710a in the unfiltered image 710. In some embodiments, the contrast between the golf ball in the foreground of the image and the rest of the foreground increases by a noticeable amount. An optical filter of golf-specific eyewear attenuates the unwanted color portion when the optical filter has an absorbance peak substantially overlapping with a luminous emittance peak of the unwanted color layer 708. An eyewear demonstration system can increase the contrast, colorfulness, and/or vividness of features of interest to a golfer when an electronic display displaying the composite image 716 is viewed through a golf-specific optical filter.

Some embodiments provide a method of preparing an image for demonstrating features of eyewear on an electronic display. The method includes preparing each of the image layers shown in FIGS. 7A-7B, displaying the composite image on an electronic display, and providing eyewear with an optical filter adapted for use with the image to demonstrate the functionality of the eyewear.

It is contemplated that the particular features, structures, or characteristics of any embodiments discussed herein can be combined in any suitable manner in one or more separate embodiments not expressly illustrated or described. In many cases, structures that are described or illustrated as unitary or contiguous can be separated while still performing the function(s) of the unitary structure. In many instances, structures that are described or illustrated as separate can be joined or combined while still performing the function(s) of the separated structures.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined by a fair reading of the claims that follow.

The following is claimed:

1. An electronic display configured to demonstrate one or more features of an optical filter for eyewear that has an absorbance peak within at least one spectral band, the display comprising:
   a display controller configured to display on the electronic display an image associated with modified image data stored on a physical memory device in operative communication with the display controller, the modified image data comprising:
   an image layer comprising realistic features captured from a real-world scene;
   a wanted color portion that contains details of at least one object of interest; and
   an unwanted color portion comprising a modification of the real-world scene of the image layer, the unwanted color portion having a spectral power distribution with a luminous emittance peak that substantially overlaps the absorbance peak of the optical filter, wherein the unwanted color portion is configured to at least partially obscure the details of the at least one object of interest, and wherein the spectral power distribution of the unwanted color portion comprises light emission spectra overlapping one or more wavelengths between 440 nm and 490 nm.

2. The electronic display of claim 1 comprising:
   a pixel density greater than or equal to 100 pixels per inch;
   a capability of displaying imagery with a luminance greater than or equal to 300 candelas per square meter; and a color gamut greater than or equal to 70% of the sRGB color space.

3. The electronic display of claim 1, wherein the luminous emittance peak comprises a spectral bandwidth equal to a full width of the luminous emittance peak at 80% of a maximum luminance of the luminous emittance peak, wherein the absorbance peak has a spectral bandwidth equal to a full width of the absorbance peak at 80% of the maximum absorbance of the absorbance peak, and wherein the spectral bandwidth of the luminous emittance peak overlaps the spectral bandwidth of the absorbance peak by greater than or equal to 5 nm.

4. The electronic display of claim 1, wherein the display controller is further configured to display the image for viewing by a user wearing the eyewear comprising the optical filter and located at a specified viewing distance.

5. The electronic display of claim 4, wherein the specified viewing distance corresponds to a distance greater than or equal to 6 inches from the electronic display.

6. The electronic display of claim 4, wherein the specified viewing distance depends on a plurality of factors comprising:
    a diagonal dimension of the electronic display; and
    a hardware pixel size of the electronic display.

7. The electronic display of claim 1, wherein the at least one object of interest comprises a chroma value, wherein the optical filter increases the chroma value of the at least one object of interest by greater than or equal to 3% compared to a neutral density attenuation filter with a same luminous transmittance as the optical filter.

8. The electronic display of claim 7, wherein the chroma value is the C* attribute of the CIE L*C*h color space.

9. The electronic display of claim 1, wherein the unwanted color portion comprises a luminous emittance peak centered near 470 nm.

10. The electronic display of claim 1, wherein the wanted color portion comprises a modification of the real-world scene of the image layer.

11. The electronic display of claim 1, wherein the object of interest comprises a portion of the real-world scene.

12. The electronic display of claim 11, wherein the object of interest comprises a modification of the real-world scene, wherein the modification can change the chroma, hue, and/or lightness of at least a portion of the object of interest.

13. The electronic display of claim 1, wherein the wanted color portion comprises a luminous emittance concentrated in the yellow and red regions.

14. The electronic display of claim 1, wherein the wanted color portion comprises light emission spectra overlapping one or more wavelengths between 590 nm and 650 nm.

15. The electronic display of claim 1, wherein the wanted color portion comprises a luminous emittance peak centered within the wavelength range of 550 nm and 680 nm.

16. An electronic display configured to demonstrate one or more features of an optical filter for eyewear that has an absorbance peak within at least one spectral band, the display comprising:
    a display controller configured to display on the electronic display an image associated with modified image data stored on a physical memory device in operative communication with the display controller, the modified image data comprising:
    an image layer comprising realistic features captured from a real-world scene;
    a portion with a feature of interest having a difference in lightness, chroma, and/or hue that makes the feature of interest distinguishable from image features surrounding the feature of interest, the portion comprising a modification of the real-world scene of the image layer, wherein the optical filter increases the difference in lightness, chroma, and/or hue by greater than or equal to 3% compared to a neutral density attenuation filter with a same luminous transmittance as the optical filter, wherein lightness, chroma, and hue are the L*, C*, and h attributes of the CIE L*C*h color space, respectively, and wherein a spectral power distribution of the portion comprises light emission spectra overlapping one or more wavelengths between 440 nm and 490 nm.

17. The electronic display of claim 16, wherein a luminous emittance peak of the spectral power distribution of the portion with a feature of interest is narrowed by the optical filter.

18. The electronic display of claim 16 comprising:
    a pixel density greater than or equal to 100 pixels per inch;
    a capability of displaying imagery with a luminance greater than or equal to 250 candelas per square meter;
    a color gamut greater than or equal to 70% of the sRGB color space; and
    a diagonal dimension of greater than or equal to 5 inches.

19. The electronic display of claim 16, wherein the modified image data comprises an unwanted color portion configured to at least partially obscure the feature of interest.

20. The electronic display of claim 19, wherein the spectral power distribution of the unwanted color portion comprises a luminous emittance peak, wherein the luminous emittance peak comprises a bandwidth equal to a full width of the luminous emittance peak at 70% of a maximum luminance of the luminous emittance peak, wherein the absorbance peak has a bandwidth equal to a full width of the absorbance peak at 70% of the maximum absorbance of the absorbance peak.

21. The electronic display of claim 16, wherein the bandwidth of the luminous emittance peak overlaps the bandwidth of the absorbance peak by greater than or equal to 5 nm.

22. The electronic display of claim 16, wherein the display controller is further configured to display the image for viewing at a specified viewing distance greater than or equal to 2 inches from the electronic display.

23. The electronic display of claim 19, wherein the specified viewing distance depends on a plurality of factors comprising:
    a diagonal distance of the electronic display; and
    a pixel size of the electronic display.

24. An electronic display configured to demonstrate one or more features of an optical filter that has an absorbance peak within at least one spectral band, the display comprising:
    a controller configured to display on the electronic display an image associated with modified image data stored on a physical memory device in operative communication with the display controller, the modified image data comprising:
    an image layer comprising realistic features captured from a real-world scene; and
    a portion with a feature of interest, the portion comprising a modification of the real-world scene of the image layer, wherein the optical filter improves an ability of a human with substantially normal vision to perceive the feature of interest when the image is displayed on the electronic display, compared to an unfiltered view of the displayed image, and wherein a spectral power distribution of the portion comprises light emission spectra overlapping one or more wavelengths between 440 nm and 490 nm.

25. The electronic display of claim 24, wherein the modified image data comprises a background portion that includes details that are recognizable by a human eye as real-world scenery.

26. The electronic display of claim 25, wherein a luminous emittance peak of the spectral power distribution of the background portion is narrowed by the optical filter.

27. The electronic display of claim 26, wherein the bandwidth of the luminous emittance peak overlaps the bandwidth of the absorbance peak by greater than or equal to 5 nm.

28. The electronic display of claim 24 comprising a pixel density greater than or equal to 100 pixels per inch.

29. The electronic display of claim 24 comprising a capability of displaying imagery with a luminance greater than or equal to 300 candelas per square meter.

30. The electronic display of claim 24 comprising a color gamut greater than or equal to 70% of the sRGB color space.

31. The electronic display of claim 24 comprising a diagonal dimension of greater than or equal to 1 inch.

32. The system of claim 24, wherein the controller is further configured to display the image for viewing at a specified distance from the electronic display, and wherein the specified distance depends on a plurality of factors comprising:
   a diagonal dimension of the electronic display; and
   a hardware pixel size of the electronic display.

* * * * *